(12) United States Patent
Fujiwara et al.

(10) Patent No.: US 11,059,484 B2
(45) Date of Patent: Jul. 13, 2021

(54) DRIVING ASSISTANCE DEVICE, VEHICLE DRIVING ASSISTANCE SYSTEM, CONTROL METHOD OF DRIVING ASSISTANCE DEVICE, AND NON-TRANSITORY RECORDING MEDIUM STORING PROGRAM

(71) Applicant: TOYOTA JIDOSHA KABUSHIKI KAISHA, Toyota (JP)

(72) Inventors: Ryotaro Fujiwara, Tokyo (JP); Ryota Okubi, Funabashi (JP); Daisuke Furukawa, Chofu (JP); Ko Koga, Tokyo (JP); Takeshi Inoshita, Kashiwa (JP); Toshiyuki Hagiya, Shiki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 242 days.

(21) Appl. No.: 16/454,628

(22) Filed: Jun. 27, 2019

(65) Prior Publication Data
US 2020/0079376 A1 Mar. 12, 2020

(30) Foreign Application Priority Data
Sep. 12, 2018 (JP) .............................. JP2018-170827

(51) Int. Cl.
*B60W 30/18* (2012.01)
*G08G 1/0967* (2006.01)

(52) U.S. Cl.
CPC . *B60W 30/18163* (2013.01); *G08G 1/096775* (2013.01); *B60W 2520/10* (2013.01); *B60W 2554/801* (2020.02); *B60W 2556/45* (2020.02)

(58) Field of Classification Search
CPC .............................................. B60W 30/18163
See application file for complete search history.

(56) References Cited

U.S. PATENT DOCUMENTS

| | | | |
|---|---|---|---|
| 8,725,395 B2 * | 5/2014 | Fukuyama | H04W 40/32 701/117 |
| 2017/0203764 A1 * | 7/2017 | Fujiki | B60W 10/20 |
| 2018/0023966 A1 * | 1/2018 | Iwai | G08G 1/0145 701/423 |

(Continued)

FOREIGN PATENT DOCUMENTS

| JP | 2008-269357 A | 11/2008 |
|---|---|---|
| JP | 2009-239584 A | 10/2009 |

*Primary Examiner* — Alex C Dunn
(74) *Attorney, Agent, or Firm* — Oliff PLC (57) ABSTRACT

A driving assistance device includes: a vehicle group search unit that acquires a most frequent vehicle speed of the vehicle and to search for one or more vehicle group, the most frequent vehicle speed being a vehicle speed that is most frequent, the vehicle group traveling at one of the most frequent vehicle speed and a speed close to the most frequent vehicle speed; a distance information generation unit that generates the vehicle group searched for by the vehicle group search unit and distance information on a distance between the vehicle group and an information-receiving vehicle that has sent the most frequent vehicle speed; and a merging assistance unit that sends the distance information generated by the distance information generation unit to a user terminal device and assists the vehicle in merging into one of the vehicle groups searched for by the vehicle group search unit.

6 Claims, 5 Drawing Sheets

(56) References Cited

U.S. PATENT DOCUMENTS

2018/0025634 A1\* 1/2018 Ujiie .................... G06F 3/0484
                                                    701/119
2018/0038701 A1\* 2/2018 Iwai .................... G08G 1/0145
2020/0004269 A1\* 1/2020 Oba .................... G08G 1/09675
2020/0012280 A1\* 1/2020 Lin ..................... B60W 60/001
2020/0231158 A1\* 7/2020 Okuyama ........... B60W 50/082

\* cited by examiner

○○ MINUTES TO MERGE INTO VEHICLE GROUP

FIG. 6

DRIVING ASSISTANCE DEVICE, VEHICLE DRIVING ASSISTANCE SYSTEM, CONTROL METHOD OF DRIVING ASSISTANCE DEVICE, AND NON-TRANSITORY RECORDING MEDIUM STORING PROGRAM

INCORPORATION BY REFERENCE

The disclosure of Japanese Patent Application No. 2018-170827 filed on Sep. 12, 2018 including the specification, drawings and abstract is incorporated herein by reference in its entirety.

BACKGROUND

1. Technical Field

The present disclosure relates to a driving assistance device connected to a vehicle and a user terminal device, a vehicle driving assistance system, a control method of the driving assistance device, and a non-transitory recording medium storing a program.

2. Description of Related Art

An inter-vehicle communication for forming a vehicle group by a plurality of vehicles is known (for example, see Japanese Patent Application Publication No. 2009-239584 (JP 2009-239584 A)). According to the technique disclosed in Japanese Patent Application Publication No. 2009-239584 (JP 2009-239584 A), a vehicle group is formed by the vehicles located in a predetermined area. The vehicles in a vehicle group are traveling at the same speed or at speeds close to each other.

SUMMARY

For the driver of a vehicle, the speed of a vehicle group to which the vehicle currently belongs is not always a desired speed. There is also a need for a driver to travel at a desired speed when entering a road from a parking lot or from a service area.

The present disclosure provides driving assistance information for allowing a driver to travel at a desired speed.

A first aspect of the present disclosure is a driving assistance device that is communicably connected to a vehicle and to a user terminal device associated with a user who uses the vehicle and that acquires information on a vehicle speed and a position of the vehicle from the vehicle for assisting in driving the vehicle. The driving assistance device includes a vehicle group search unit configured to acquire a most frequent vehicle speed of the vehicle and to search for one or more vehicle group, the most frequent vehicle speed being a vehicle speed that is most frequent, the vehicle group including a plurality of vehicles traveling in a group, the vehicle group traveling at one of the most frequent vehicle speed and a speed close to the most frequent vehicle speed; a distance information generation unit configured to generate distance information on the vehicle group searched for by the vehicle group search unit and a distance between the vehicle group and an information-receiving vehicle that has sent the most frequent vehicle speed; and a merging assistance unit configured to send the distance information generated by the distance information generation unit to the user terminal device corresponding to the information-receiving vehicle and configured to assist the vehicle in merging into one of the vehicle groups searched for by the vehicle group search unit.

With the configuration described above, the driving assistance device acquires the most frequent vehicle speed indicating the driver's desired speed, provides the driver with the information on a vehicle group traveling at the most frequent vehicle speed or at a speed close to the most frequent vehicle speed and, in addition, assists the vehicle in merging into the vehicle group, allowing the driver to travel at a driver's desired speed.

The driving assistance device may further include a merging time calculation unit that calculates a merging time, the merging time being a time required for a merging-target vehicle group to reach a merging point, the merging-target vehicle group being one or more vehicle groups which is searched for by the vehicle group search unit and into which the vehicle is to merge. The merging assistance unit may be configured to send the merging time calculated by the merging time calculation unit to the information-receiving vehicle.

With the configuration described above, the driving assistance device sends a merging time to merge into the vehicle group to the information-receiving vehicle. This allows the vehicle to merge into the vehicle group while confirming the merging time, enabling the driver to reliably merge into the vehicle group traveling at a driver's desired speed.

In the driving assistance device described above, the vehicle group search unit may be configured to acquire the most frequent vehicle speed when the vehicle enters a parking state. The merging assistance unit may be configured to send the distance information to the user terminal device corresponding to the information-receiving vehicle in a period before the vehicle is driven and may be configured to assist the vehicle in merging into the vehicle group when the vehicle is driven.

With the configuration described above, the driving assistance device sends the approach information on a vehicle group traveling at a driver's desired speed to the terminal device of the driver. This allows the driver to get the information on the approach of the vehicle group even if the driver is away from the vehicle. In addition, when the vehicle is driven, the driving assistance device assists the vehicle in merging into the vehicle group. Therefore, when the driver takes an action to start the vehicle, the driving assistance device automatically assists the vehicle in merging. Therefore, the driving assistance device allows the vehicle to merge into a vehicle group traveling at a driver's desired speed with no extra burden on the driver.

A second aspect of the present disclosure is a vehicle driving assistance system. The vehicle driving assistance system includes one or more vehicle; a driving assistance device that acquires information on a vehicle speed and a position of the vehicle from the vehicle for assisting in driving the vehicle; and a user terminal device associated with a user who uses the vehicle. The driving assistance device includes a vehicle group search unit configured to acquire a most frequent vehicle speed of the vehicle and to search for one or more vehicle group, the most frequent vehicle speed being a vehicle speed that is most frequent, the vehicle group including a plurality of vehicles traveling in a group, the vehicle group traveling at one of the most frequent vehicle speed and a speed close to the most frequent vehicle speed; a distance information generation unit configured to generate the vehicle group searched for by the vehicle group search unit and distance information on a distance between the vehicle group and an information-receiving vehicle that has sent the most frequent vehicle speed; and a merging assistance unit configured to send the distance information generated by the distance information generation unit to the user terminal device corresponding to the information-receiving vehicle and configured to assist the vehicle in merging into one of the vehicle groups searched for by the vehicle group search unit.

With the configuration described above, the vehicle driving assistance system acquires the most frequent average vehicle speed indicating the driver's desired speed, provides the driver with the information on the vehicle group traveling at the most frequent average vehicle speed or at a speed close to the most frequent average vehicle speed and, in addition, assists the vehicle in merging into the vehicle group, allowing the driver to travel at a driver's desired speed.

A third aspect of the present disclosure is a control method of a driving assistance device. The driving assistance device is configured to be communicably connected to a vehicle and to a user terminal device associated with a user who uses the vehicle and to acquire information on a vehicle speed and a position of the vehicle from the vehicle for assisting in driving the vehicle. The control method includes: acquiring, by the driving assistance device, a most frequent vehicle speed of the vehicle and searching, by the driving assistance device, for one or more vehicle group, the most frequent vehicle speed being a vehicle speed that is most frequent, the vehicle group including a plurality of vehicles traveling in a group, the vehicle group traveling at one of the most frequent vehicle speed and a speed close to the most frequent vehicle speed; generating, by the driving assistance device, the searched vehicle group and distance information on a distance between the vehicle group and an information-receiving vehicle that has sent the most frequent vehicle speed; sending, by the driving assistance device, the generated distance information to the user terminal device corresponding to the information-receiving vehicle; and assisting, by the driving assistance device, the vehicle in merging into one of the searched vehicle groups.

With the configuration described above, the control method of a driving assistance device acquires the most frequent average vehicle speed indicating the driver's desired speed, provides the driver with the information on the vehicle group traveling at the most frequent average vehicle speed or at a speed close to the most frequent average vehicle speed and, in addition, assists the vehicle in merging into the vehicle group, allowing the driver to travel at a driver's desired speed.

A fourth aspect of the present disclosure is a non-transitory recording medium storing a program. The program causes a driving assistance device to execute a vehicle group search step, a distance information generation step, a distance information sending step, and a merging assistance step. The driving assistance device is configured to be communicably connected to a vehicle and to a user terminal device associated with a user who uses the vehicle and to acquire information on a vehicle speed and a position of the vehicle from the vehicle for assisting in driving the vehicle. The vehicle group search step is a step for acquiring a most frequent vehicle speed of the vehicle and for searching for one or more vehicle group, the most frequent vehicle speed being a vehicle speed that is most frequent, the vehicle group including a plurality of vehicles traveling in a group, the vehicle group traveling at one of the most frequent vehicle speed and a speed close to the most frequent vehicle speed. The distance information generation step is a step for generating the vehicle group searched for by the vehicle group search step and distance information on a distance between the vehicle group and an information-receiving vehicle that has sent the most frequent vehicle speed. The distance information sending step is a step for sending the distance information generated by the distance information generation step to the user terminal device corresponding to the information-receiving vehicle. The merging assistance step is a step for assisting the vehicle in merging into one of the vehicle groups searched for by the vehicle group search step.

With the configuration described above, the program acquires the most frequent average vehicle speed indicating a driver's desired speed, provides the driver with the information on a vehicle group traveling at the most frequent average vehicle speed or at a speed close to the most frequent average vehicle speed and, in addition, assists the vehicle in merging into the vehicle group, allowing the driver to travel at a driver's desired speed.

With the configuration described above, the present disclosure provides a driver with the driving assistance information for traveling at a driver-desired speed, allowing the driver to drive the vehicle at a desired speed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

One embodiment of the present disclosure will be described in detail below with reference to the drawings. In the figures in one embodiment below, the same reference numeral is used for the same or an equivalent component. Note that the present disclosure is not limited by one embodiment that will be described below.

Figure 1:
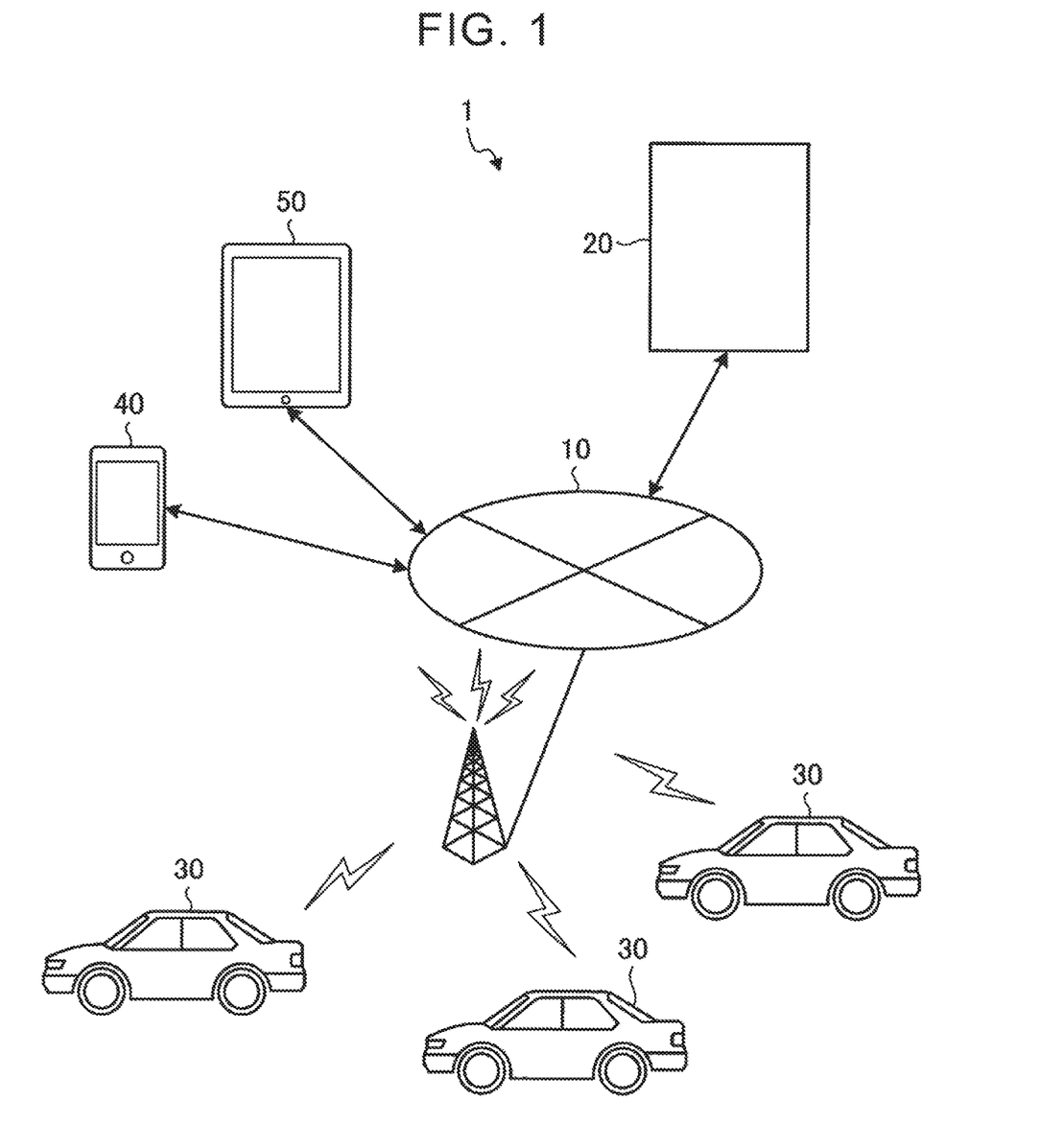
FIG. 1 is a schematic diagram showing a vehicle driving assistance system that includes a driving assistance device according to one embodiment of the present disclosure.
Figure 2:
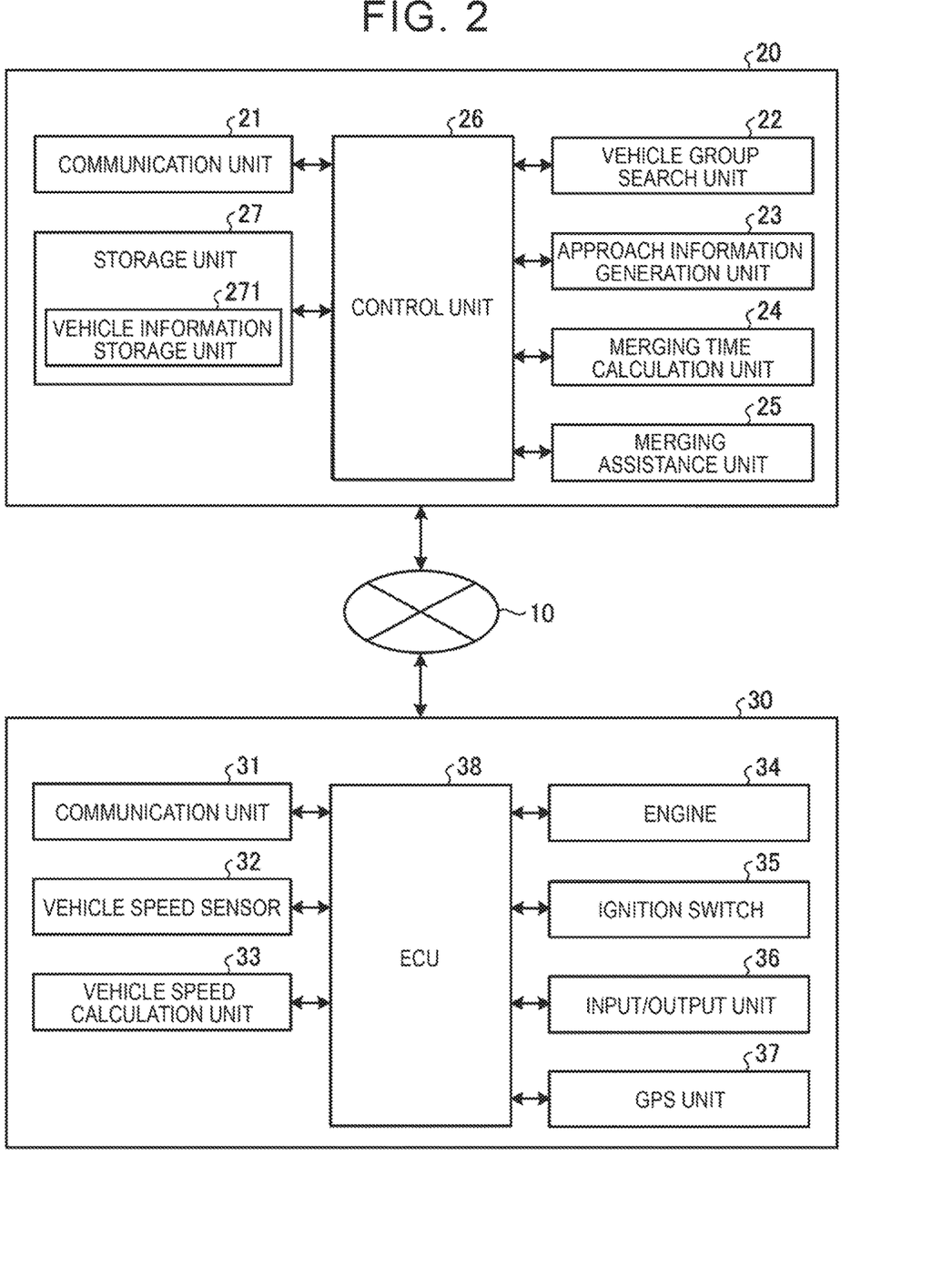
FIG. 2 is a block diagram showing a configuration of a center and a vehicle driving assistance device provided in the vehicle driving assistance system according to one embodiment of the present disclosure.

First, a vehicle driving assistance system that includes a driving assistance device according to one embodiment of the present disclosure will be described. FIG. 1 is a schematic diagram showing the vehicle driving assistance system according to one embodiment of the present disclosure. FIG. 2 is a block diagram showing a configuration of a center and the vehicle driving assistance device provided in the vehicle driving assistance system according to one embodiment of the present disclosure.

As shown in FIG. 1, a vehicle driving assistance system 1 according to this one embodiment includes a network 10, a center 20, vehicles 30, and user terminal devices 40 and 50. The network 10 is configured by an Internet network or a mobile telephone network over which the center 20, the vehicles 30, and the user terminal devices 40 and 50 can communicate with each other. That is, in the vehicle driving assistance system 1 according to this one embodiment, the center 20, vehicles 30, and the user terminal devices 40 and 50 are connected to each other by the network 10 in such a way that they can communicate with each other.

The center 20 acquires the speed information from each of the vehicles 30 and provides assistance information that allows the driver to drive at a speed that the driver desires. In addition, the center 20 may perform the safety confirmation processing for the vehicles 30. The center 20 is an example of a driving assistance device.

As shown in FIG. 2, the center 20 includes a communication unit 21, a vehicle group search unit 22, an approach information generation unit 23, a merging time calculation unit 24, a merging assistance unit 25, a control unit 26 and a storage unit 27.

The communication unit 21 is connected to the network 10 for communication with the vehicles 30 and the user terminal device 40 or 50. The communication unit 21 receives the information on the speed of a vehicle (sometimes simply referred to as "vehicle speed" in the description below) from the vehicles 30 and sends the information on the vehicle groups suitable for a vehicle to which the information is to be sent. The information on the vehicle speed includes the information for individually identifying each of the vehicles 30. In addition, the communication unit 21 sends the approach information on a vehicle group, suitable for the vehicle, to the user terminal device 40 or 50 carried by a user (for example, the driver or a passenger). The communication unit 21 also receives the user identification information, which identifies the user of the user terminal device 40 or 50, and various information from the terminal device 40 or 50.

The vehicle group search unit 22 forms a vehicle group and determines the representative speed of the vehicle group. The vehicle group is a group of vehicles 30 in which each of the vehicles 30 cannot travel freely (for example, cannot pass another vehicle freely); for example, on a road on which there are two lanes on each side, the vehicle group is a group of vehicles traveling together in the two lanes in the same direction. The vehicle group search unit 22 determines whether there is a vehicle group based on the number of vehicles traveling in a predetermined section within a predetermined period. The vehicle group search unit 22 gives the representative speed of a detected vehicle group to that vehicle group. The representative speed may be the average of the speeds of the vehicles 30 belonging to the vehicle group or may be the most frequent speed, the fastest speed, or the slowest speed of the vehicles 30 belonging to the vehicle group. A vehicle group may be formed by a block other than the vehicle group search unit 22. In addition, the center 20 may acquire the information on a vehicle group formed by an external device. When the most frequent average vehicle speed is received from the vehicle 30, the vehicle group search unit 22 searches for a vehicle group traveling at a speed equal to the most frequent average vehicle speed or at a speed close to the most frequent average vehicle speed. The speed close to the most frequent average vehicle speed is a speed, for example, in a range of the most frequent average vehicle speed±5 km/h. The vehicle group search unit 22 searches the vehicle groups in a range, for example, in a range within up to 50 km downstream of the road connected to the position of the information-receiving vehicle 30, for a vehicle group traveling at the above-mentioned speed. The information-receiving vehicle 30 is a vehicle that receives the driving assistance information, such as the approach information and the merging assistance information, that will be described later.

The approach information generation unit 23 generates approach information indicating that the vehicle group, detected by the vehicle group search unit 22, is approaching the information-receiving vehicle 30. More specifically, the approach information generation unit 23 calculates the distance between the vehicle group, detected by the vehicle group search unit 22, and the information-receiving vehicle 30, and generates the information on the calculated distance as the approach information. When there is a plurality of detected vehicle groups, the approach information generation unit 23 calculates the distance to the information-receiving vehicle 30 for each vehicle group. The approach information generation unit 23 is an example of a distance information generation unit, and the approach information is an example of the distance information.

The merging time calculation unit 24 calculates the time to merge into the closest vehicle group, which is the closest among the vehicle groups detected by the vehicle group search unit 22, when the vehicle 30 that has been stopped is started again (for example, when the ignition switch is turned on). The merging time calculation unit 24 calculates the time required for the vehicle group to reach the merging point based on the distance from the representative position (for example, the head, center, or tail) of the vehicle group to the merging point (the merging point Q that will be described later: see FIG. 6) and on the speed of the vehicle group (speed V that will be described later: see FIG. 6).

The merging assistance unit 25 generates the information for assisting in merging, such as the vehicle group approach information and the merging time information, and sends the generated information to the user terminal device 40 or 50 or the information-receiving vehicle 30 via the communication unit 21. More specifically, the merging assistance unit 25 sends the approach information, generated by the approach information generation unit 23, to the user terminal device 40 or 50 associated with the information-receiving vehicle 30, and the merging time, calculated by the merging time calculation unit 24, to the information-receiving vehicle 30.

The control unit 26 includes a computer, which includes a Central Processing Unit (CPU), a Read Only Memory (ROM), and a Random Access Memory (RAM), as its main component. The control unit 26 controls the whole operation of the units of the center 20.

The storage unit 27 includes storage media, such as a hard disk and a semiconductor memory, and drive devices for these storage media. Various programs and various data are stored in such a way that they can be written to and read from the storage unit 27 as necessary.

The storage unit 27 includes a vehicle information storage unit 271. The vehicle information storage unit 271 stores the user identification information and the information on the vehicle 30, such as the speed information, in such a way that they are associated in a searchable format. The user identification information is, for example, the information on the name and address of a user and the information on the vehicle 30 of the user. The speed information is the information on the vehicle speed of the vehicle 30 detected by a vehicle speed sensor, which will be described later, and the information on the position at which the vehicle speed is detected the vehicle speed information, associated with the date and time when the vehicle speed was detected, is stored as an individual profile for each of the vehicles 30.

As shown in FIG. 2, the vehicle 30 includes at least a communication unit 31, a vehicle speed sensor 32, a vehicle speed calculation unit 33, an engine 34, an ignition (IG) switch 35, an input/output unit 36, a Global Positioning System (GPS) unit 37, and an Electronic Control Unit (ECU) 38. Although not shown, a drive transmission mechanism for transmitting the driving force of the engine 34, drive wheels for traveling, a shift lever, a shift position sensor for detecting the position of the shift lever are also provided in the vehicle 30.

The communication unit 31 wirelessly communicates with the center 20 over the network 10.

The vehicle speed sensor 32 detects the speed (vehicle speed) of the vehicle 30 and outputs the electric signal indicating the detected vehicle speed to the ECU 38. The electric signal indicating the vehicle speed is output to the outside or stored in a storage unit (not shown).

The vehicle speed calculation unit 33 periodically acquires the vehicle speed, for example, after the shift lever position is switched from the parking position (P position) to the drive position (D position), and calculates the average of the vehicle speeds at preset time intervals. When the shift lever position is switched from the D position to the P position, the vehicle speed calculation unit 33 calculates the most frequent average vehicle speed from the calculated average vehicle speeds. The vehicle speed calculation unit 33 may calculate the most frequent vehicle speed from the acquired vehicle speeds.

The engine 34 burns fuel to output power. The engine 34 is configured using an internal combustion engine such as a gasoline engine or a diesel engine.

The ignition switch 35 outputs the instruction signal for controlling the electric system of the vehicle 30 when the corresponding button is pressed. For example, the ignition (IG) switch 35 starts the engine 34 or turns on or off the power of the components of the vehicle 30.

The input/output unit 36 includes a touch panel display, a speaker microphone, and the like. The input/output unit 36 is configured to be able to output the predetermined information such as the driving assistance information by displaying characters and figures on the screen of the touch panel display, or by outputting sound from the speaker microphone, under control of the ECU 38. The input/output unit 36 is also configured to allow the user to operate the touch panel display, or to speak to the speaker microphone, for entering the predetermined information into the ECU 38.

The GPS unit 37 receives radio waves from GPS satellites to detect the position of the vehicle 30. The detected position is output to the outside, or is stored in a storage unit (not shown), as the position information on the vehicle 30.

The ECU 38 is configured by an information processing device such as a microcomputer that includes a CPU, a ROM, and a RAM. The ECU 38 controls the whole electrical operation of the units of the vehicle 30. For example, the ECU 38 automatically stops the engine 34 when the brake pedal is operated while the vehicle is traveling and restarts the engine 34, which was automatically stopped, when a predetermined restart condition is satisfied. The ECU 38 sends the average vehicle speed and the most frequent average vehicle speed, calculated by the vehicle speed calculation unit 33, to the center 20 via the communication unit 31.

The vehicle 30 is provided with a storage unit (not shown) that includes storage media, such as a hard disk and a semiconductor memory, and the drive devices of the storage media. This storage unit stores the operating system (OS), necessary for the ECU 38 to control the whole operation of the units of the vehicle 30, and various application programs.

The vehicle 30 is provided also with known equipment (not shown) necessary for traveling. More specifically, the engine 34 may be configured to generate power using a motor that is driven by burning fuel. The generated power is charged, for example, in a rechargeable battery.

The user terminal device 40 or 50 is operated by at least one of the users (driver or passenger) in the vehicle 30. The user terminal device 40 or 50 sends various information such as the user information, which includes the user identification information and the user selected information, to the center 20 via various types of data through a communication application or via a call by voice. The user identification information includes the information, such as a user ID and a password, necessary to access the center 20 when sending the user information. Each of the user terminal devices 40 and 50 is configured to be able to receive various information, such as the driving assistance information, from the center 20. Each of the user terminal devices 40 and 50 has a microcomputer, which includes components such as a CPU, a ROM, a RAM, as its main components. In addition, each of the user terminal devices 40 and 50 includes a touch panel keyboard, such as a touch panel display, that is built in a display unit 53 for detecting a touch operation on the display panel or a voice input device, such as a speaker microphone, that enables communication with the outside. An electronic control unit controls the whole operations of an input unit, a display unit, a communication unit, and a storage unit by executing various application programs. More specifically, as the user terminal device 40 or 50, a mobile phone such as a smart phone, a tablet-type information terminal, or a personal computer can be used. In this embodiment, it is assumed that the user terminal device 40 is a mobile phone and the user terminal device 50 is an information terminal.

Figure 3:
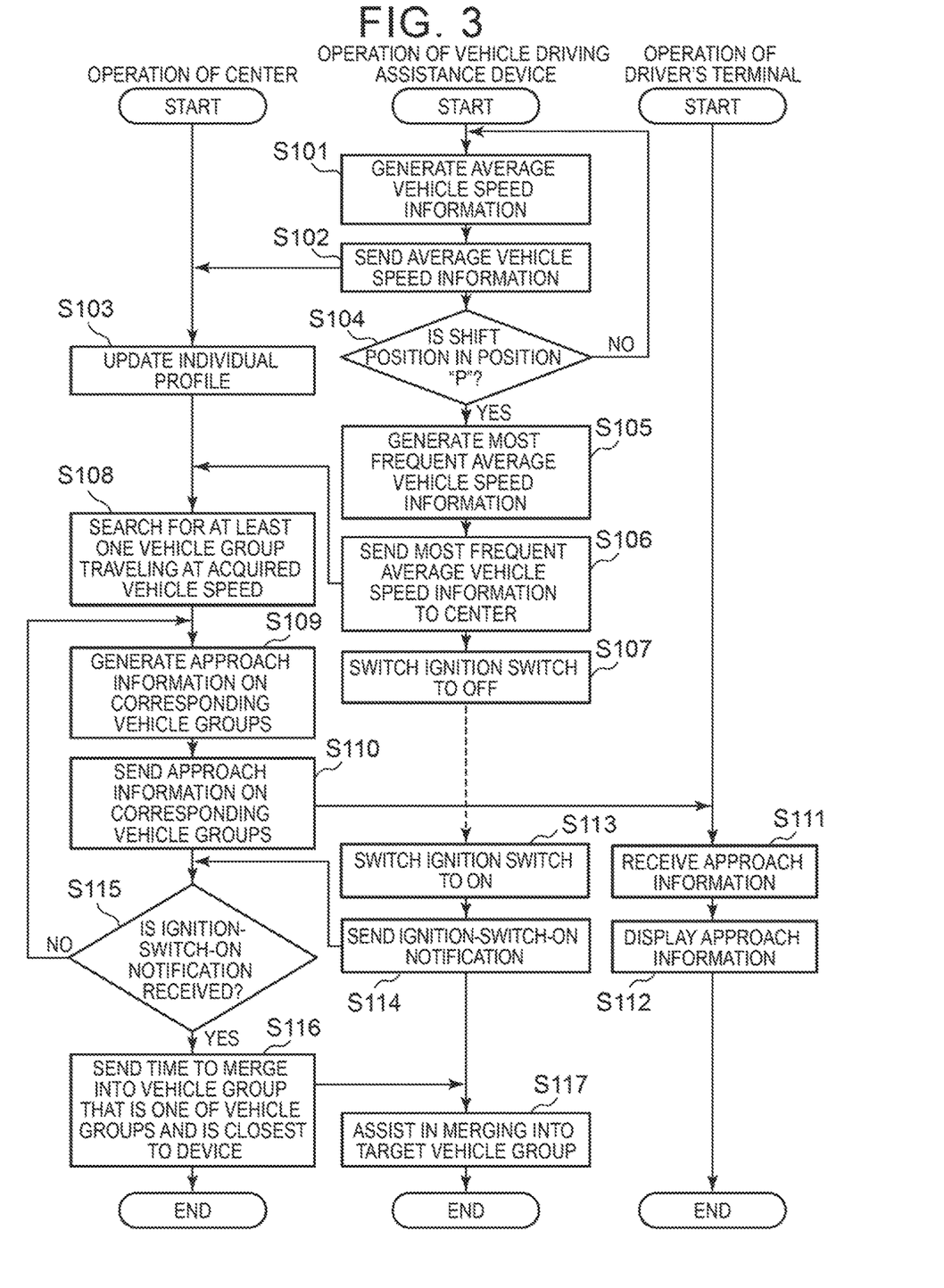
FIG. 3 is a flowchart showing the driving assistance processing performed by the vehicle driving assistance system according to one embodiment of the present disclosure.

Next, the driving assistance processing performed by the vehicle driving assistance system 1 will be described with reference to FIG. 3 to FIG. 6. FIG. 3 is a flowchart showing the driving assistance processing performed by the vehicle driving assistance system according to one embodiment of the present disclosure. The flowchart shown in FIG. 3 is started, for example, when the ignition switch 35 of the vehicle 30 is switched from OFF to ON, that is, when the vehicle 30 enters the driving state.

While the vehicle 30 is traveling, the vehicle speed calculation unit 33 in the vehicle 30 generates the average vehicle speed information at preset intervals under the control of the ECU 38 (step S101). The average vehicle speed information is generated based on the detection result of the vehicle speed sensor 32 acquired at the intervals described above.

When the average vehicle speed information is generated, the ECU 38 sends the average vehicle speed information to the center 20 in association with the generation time (step S102). The average vehicle speed information includes the information for identifying the vehicle 30 and the position information detected by the GPS unit 37.

When the average vehicle speed information is acquired from the vehicle 30, the center 20 adds the acquired average vehicle speed information to the individual profile of the vehicle 30 for updating the stored information (step S103). In this way, the center 20 acquires the average vehicle speed information from each of the vehicles 30 that are traveling. Then, the center 20 forms a vehicle group from the acquired average vehicle speed information. A vehicle group, which is formed based on the position information and the average speed of the vehicle 30, can be generated based on a known method. A vehicle group is given a representative speed.

In addition, the ECU 38 determines whether the shift lever position (shift position) is in the parking position "P" (step S104). When it is determined that the shift position is not in the parking position "P" (Step S104: No), the processing of the ECU 38 returns to step S101 to repeat the processing. On the other hand, when it is determined that the shift position is in the shift position "P" (step S104: Yes), the processing of the ECU 38 proceeds to step S105. When it is determined in step S104 that the parking position is in the position "P", the vehicle 30 (ECU 38) determines that the vehicle 30 has entered the parking state.

In step S105, the vehicle speed calculation unit 33 calculates the most frequent average vehicle speed of the average vehicle speeds calculated after the ignition switch 35 was switched to ON. After calculating the most frequent average vehicle speed, the vehicle speed calculation unit 33 outputs it to the ECU 38. Note that the vehicle speed calculation unit 33 may calculate the most frequent vehicle speed from the vehicle speeds acquired after the ignition switch 35 was switched to ON.

After acquiring the most frequent average vehicle speed, the ECU 38 sends it to the center 20 as the most frequent average vehicle speed information associated with the vehicle information (step S106). The most frequent average vehicle speed information includes the most frequent average vehicle speed as well as the information identifying the vehicle 30 and the position information detected by the GPS unit 37. After that, when the user presses the button, the ignition switch 35 is switched from ON to OFF (step S107).

When the center 20 acquires the most frequent average vehicle speed information from the vehicle 30, the vehicle group search unit 22 searches for at least one vehicle group traveling at the acquired most frequent average vehicle speed (step S108: vehicle group search step). For example, the vehicle group search unit 22 searches the vehicle groups in a range, for example, in a range from the position of the road connected to the position of the information-receiving vehicle 30 to 50 km downstream of that position, for at least one vehicle group traveling at the acquired most frequent average vehicle speed or at a speed in a range of the acquired most frequent average vehicle speed±5 km/h.

In step S109 that follows step S108, the approach information generation unit 23 calculates the distance between the vehicle group, detected by the vehicle group search unit 22, and the information-receiving vehicle 30, and generates the distance information as the approach information (distance information generation step). When there is no suitable vehicle group, the information indicating that there is no vehicle group suitable for merging is output as the approach information. At this time, it is also possible to output, as the additional information, the information on a vehicle group traveling at a speed closest to the speed search range from among the vehicle groups of a speed outside the search range.

The merging assistance unit 25 sends the generated approach information to the user terminal devices 40 or 50 associated with the information-receiving vehicle 30 via the communication unit 21 (step S110: distance information sending step).

When the approach information is received from the center 20 (step S111), the user terminal device 40 or 50 displays the approach information on the display unit (step S112).

Figure 4:
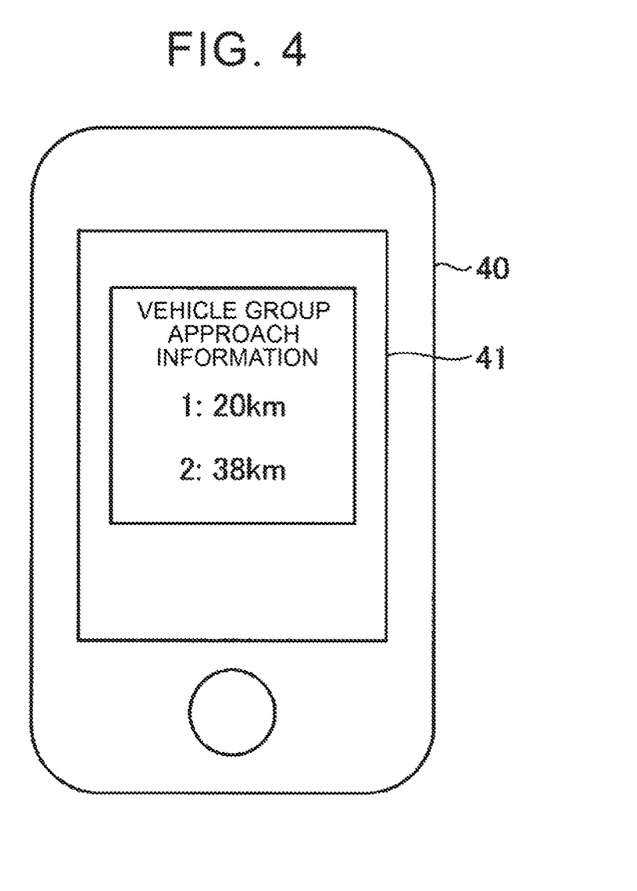
FIG. 4 is a diagram showing an example of a display of approach information displayed by the driving assistance processing performed by the vehicle driving assistance system according to one embodiment of the present disclosure.

FIG. 4 is a diagram showing an example of the display of approach information displayed by the driving assistance processing performed by the vehicle driving assistance system according to one embodiment of the present disclosure. For example, as shown in FIG. 4, the display unit of the user terminal device 40 displays the information indicating the vehicle groups each traveling at a desired speed and indicating how far downstream each vehicle group is. In FIG. 4, two vehicle groups are extracted by the search and numbers are assigned in order from the closest one. By confirming the user terminal device 40, the user can recognize that the first vehicle group (vehicle group 1) is 20 km away and the second vehicle group (vehicle group 2) is 38 km away. This displayed information allows, for example, a user who is resting in a service area to determine at what time it is preferable to return to the vehicle 30 for driving it again. Instead of the distance, the time to the merging point may also be displayed.

After that, when the user presses the button, the ignition switch 35 is switched from OFF to ON (step S113). In the example of the service area described above, the user who has confirmed the user terminal device 40 and returned to the vehicle 30 presses the button.

When the ignition switch 35 is switched to ON, the ECU 38 sends a notification to the center 20 to indicate that the ignition switch 35 is switched to ON (step S114).

After sending the approach information in step S110, the center 20 determines whether a notification indicating that the ignition switch 35 is switched to ON is received (step S115). When it is determined that the notification indicating that the ignition switch 35 is switched to ON has not been received (step S115: No), the processing of the control unit 26 returns to step S109 to cause the approach information generation unit 23 to create the approach information again. In this case, instead of returning to step S109, the processing may return to step S108 to search for a new vehicle group. On the other hand, when it is determined that the notification indicating that the ignition switch 35 is switched to ON is received (step S115: Yes), the processing of the control unit 26 proceeds to step S116.

In step S116, the merging time calculation unit 24 calculates the time for the information-receiving vehicle 30 to merge into a vehicle group that is one of the vehicle groups detected by the vehicle group search unit 22 and is closest to the information-receiving vehicle 30. The calculated merging time is sent to the information-receiving vehicle 30 via the communication unit 21.

When the merging time is received, the information-receiving vehicle 30 performs the merging assistance processing to merge into a vehicle group based on the information received from the merging assistance unit 25 (step S117: merging assistance step). In this embodiment, the vehicle 30 displays the merging time to merge into a vehicle group, acquired from the merging assistance unit 25, to assist in merging into the vehicle group.

Figure 5:
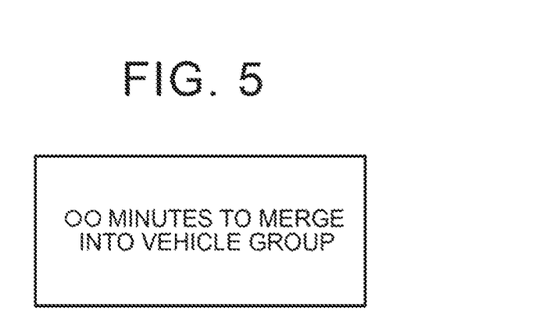
FIG. 5 is a diagram showing an example of a display of merging assistance information displayed by the driving assistance processing performed by the vehicle driving assistance system according to one embodiment of present disclosure.
Figure 6:
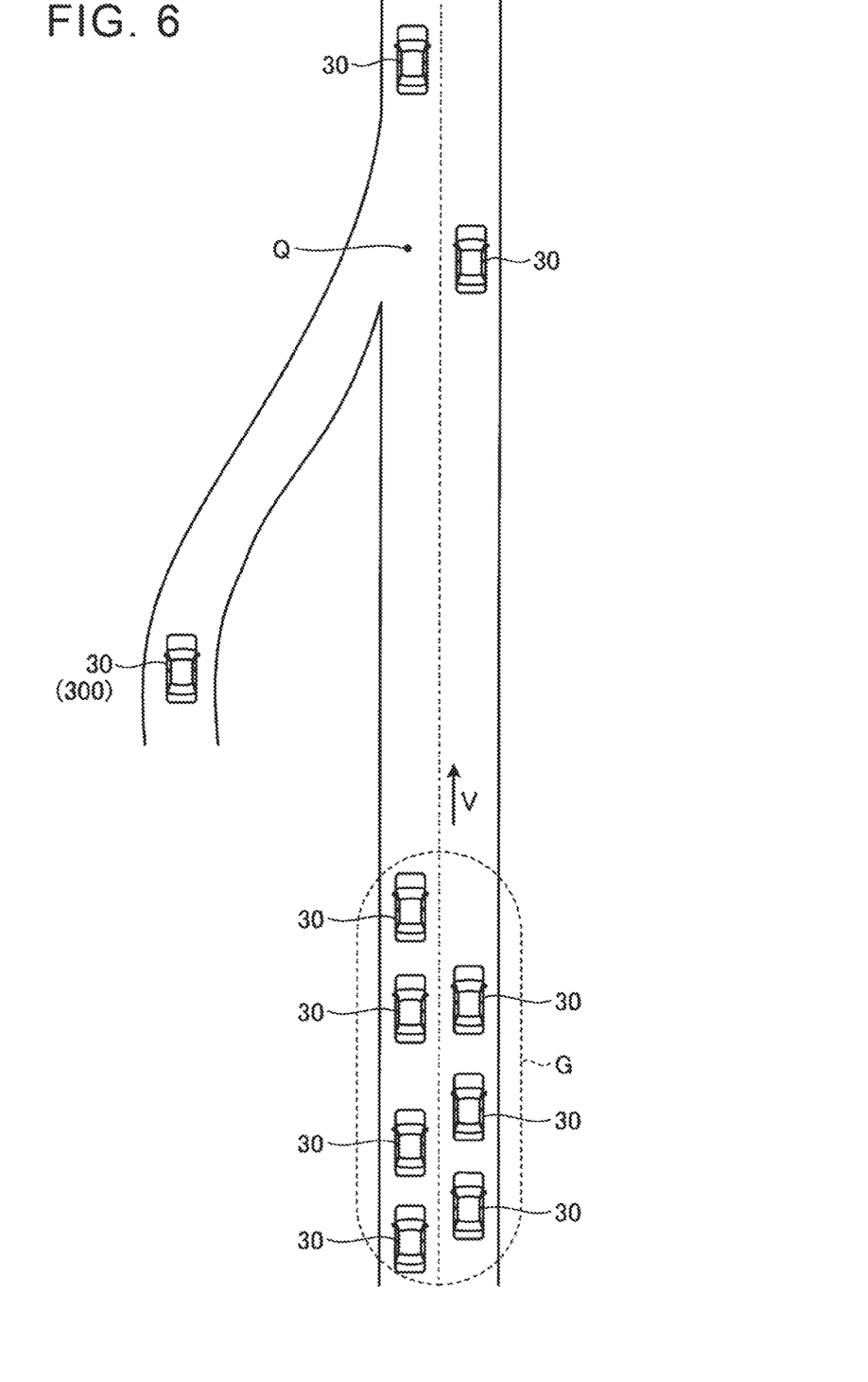
FIG. 6 is a diagram showing an example of a situation in which a vehicle merges into a vehicle group by the driving assistance processing performed by the vehicle driving assistance system according to one embodiment of the present disclosure.

FIG. 5 is a diagram showing an example of the display of merging assistance information displayed by the driving assistance processing performed by the vehicle driving assistance system according to one embodiment of present disclosure. FIG. 6 is a diagram showing an example of a situation in which a vehicle merges into a vehicle group by the driving assistance processing performed by the vehicle driving assistance system according to one embodiment of the present disclosure. For example, the time to merge into a vehicle group, such as the one shown in FIG. 5, is displayed on the input/output unit 36 of the vehicle 30 (such as the touch panel display). While checking the displayed time, the user moves the vehicle 30 from the parking position to the merging point Q (see FIG. 6). This display allows an information-receiving vehicle 300, driven by the user, to merge into the vehicle group G into which the information-receiving vehicle 300 is going to merge and which is traveling at a user-desired speed (speed V). In addition to the merging assistance described above, there are the following types of assistance in merging into a vehicle group: merging assistance by sound or light, merging assistance by drive control based on a control signal from the center 20, and merging assistance by drive control via inter-vehicle communication. For example, when the merging time is notified by sound, the sound may be output in a sound pattern that allows the user to identify the merging time (e.g., the interval at which the sound is output becomes shorter as the time to the merging point becomes shorter). In addition, the control unit 26 may obtain the information on the distance between the vehicle 300 and the vehicle group G and, then, change the interval between sound outputs according to the distance between the vehicle 300 and the vehicle group G. Note that, when there is no target vehicle group into which the information-receiving vehicle 300 is to merge, the control unit 26 may output the information on a time at which the vehicle can travel without changing lanes or without passing another vehicle even when the vehicle travels with the most frequent average vehicle speed of the user. Furthermore, the control unit 26 may determine whether the vehicle 300 has merged into the vehicle group G by acquiring the position information on the vehicle 300 and the position information on the vehicle group G into which the information-receiving vehicle 300 is to merge; in this case, when it is determined that the vehicle has not merged into the vehicle group G, the control unit 26 may send the approach information or the merging time information to the information-receiving vehicle 300 again to assist in merging into an appropriate vehicle group.

After the vehicle 30 has merged into the vehicle group G, the user may manually drive the vehicle 30 to travel in a group or may autonomously drive the vehicle 30, which belongs to the vehicle group G, in a group via vehicle-to-vehicle communication. To allow the vehicle to autonomously travel in a group, a known disclosed technique, such as the one disclosed in Japanese Patent Application Publication No. 2008-269357 (JP 2008-269357 A), may be used.

When it is desired to change the speed after merging into the vehicle group G, the vehicle 30 may leave the vehicle group G and travel at a new desired speed. To re-set the speed, a new desired speed may be entered by the user via the input/output unit 36 or may be set from the individual profile at the center 20. After setting the speed, the above-described processing is executed (for example, the vehicle group search unit 22 searches for a vehicle group traveling at the speed that has been set) and the merging information is output to the vehicle 30. It is also possible to set that the vehicle 30 will not merge into a vehicle group. For example, when it is set not to merge into a vehicle group, the information is output that allows the vehicle to enter the road in such a way the vehicle will travel between the vehicle groups that the vehicle group search unit 22 has searched for.

In the embodiment described above, at least one vehicle group traveling at a speed close to the most frequent average vehicle speed is extracted from among the vehicle groups formed based on the speed information sent from each vehicle 30 and, then, the distance to the extracted vehicle group and the time to merging into the extracted vehicle group are provided to the user. In this way, this embodiment provides the driver with the driving assistance information for traveling at a driver's desired speed, allowing the driver to drive the vehicle at a desired speed.

The most frequent average vehicle speed, which is calculated by the vehicle speed calculation unit 33 in the embodiment described above, may be calculated on the center 20 side. In this case, when the information indicating that the shift position is set to the parking position "P" (that is, the information indicating that the vehicle 30 is now in the parked state) is acquired from the vehicle 30, the center 20 calculates the most frequent average vehicle speed from the acquired average vehicle speeds. Instead of this, the center 20 may periodically acquire detected vehicle speeds from the vehicle 30 and stores them in the individual profile and, when the information indicating that the vehicle 30 is in the parking state is acquired, the center 20 may calculate the most frequent vehicle speed using the vehicle speeds stored in the individual profile. In this embodiment, the most frequent vehicle speed, either the most frequent average vehicle speed or the vehicle speed that is most frequent, is used to search for a vehicle group.

Although one embodiment of present disclosure has been described above, the present disclosure is not limited to the above-described embodiment but various modifications based on the technical spirit of the present disclosure are possible. For example, the configuration of each device mentioned in the above-described embodiment is merely an example and a different configuration may be used as necessary.

What is claimed is:

1. A driving assistance device that is communicably connected to a vehicle and to a user terminal device associated with a user who uses the vehicle and that acquires information on a vehicle speed and a position of the vehicle from the vehicle for assisting in driving the vehicle, the driving assistance device comprising:
   a vehicle group search unit configured to acquire a most frequent vehicle speed of the vehicle and to search for one or more vehicle group, the most frequent vehicle speed being a vehicle speed that is most frequent, the vehicle group including a plurality of vehicles traveling in a group, the vehicle group traveling at one of the most frequent vehicle speed and a speed close to the most frequent vehicle speed;
   a distance information generation unit configured to generate distance information on the vehicle group searched for by the vehicle group search unit and a distance between the vehicle group and an information-receiving vehicle that has sent the most frequent vehicle speed; and
   a merging assistance unit configured to send the distance information generated by the distance information generation unit to the user terminal device corresponding to the information-receiving vehicle and configured to assist the vehicle in merging into one of the vehicle groups searched for by the vehicle group search unit.

2. The driving assistance device according to claim 1, further comprising:
   a merging time calculation unit that calculates a merging time, the merging time being a time required for a merging-target vehicle group to reach a merging point, the merging-target vehicle group being one or more of vehicle groups which is searched for by the vehicle group search unit and into which the vehicle is to merge, wherein the merging assistance unit is configured to send the merging time calculated by the merging time calculation unit to the information-receiving vehicle.

3. The driving assistance device according to claim 1, wherein the vehicle group search unit is configured to acquire the most frequent vehicle speed when the vehicle enters a parking state and the merging assistance unit is configured to send the distance information to the user terminal device corresponding to the information-receiving vehicle in a period before the vehicle is driven and is configured to assist the vehicle in merging into the vehicle group when the vehicle is driven.

4. A vehicle driving assistance system comprising:

one or more vehicle;

a driving assistance device that acquires information on a vehicle speed and a position of the vehicle from the vehicle for assisting in driving the vehicle; and a user terminal device associated with a user who uses the vehicle, wherein the driving assistance device comprises a vehicle group search unit configured to acquire a most frequent vehicle speed of the vehicle and to search for one or more vehicle group, the most frequent vehicle speed being a vehicle speed that is most frequent, the vehicle group including a plurality of vehicles traveling in a group, the vehicle group traveling at one of the most frequent vehicle speed and a speed close to the most frequent vehicle speed; a distance information generation unit configured to generate the vehicle group searched for by the vehicle group search unit and distance information on a distance between the vehicle group and an information-receiving vehicle that has sent the most frequent vehicle speed; and a merging assistance unit configured to send the distance information generated by the distance information generation unit to the user terminal device corresponding to the information-receiving vehicle and configured to assist the vehicle in merging into one of the vehicle groups searched for by the vehicle group search unit.

5. A control method of a driving assistance device, the driving assistance device is configured to be communicably connected to a vehicle and to a user terminal device associated with a user who uses the vehicle and to acquire information on a vehicle speed and a position of the vehicle from the vehicle for assisting in driving the vehicle, the control method comprising:

acquiring, by the driving assistance device, a most frequent vehicle speed of the vehicle and searching, by the driving assistance device, for one or more vehicle group, the most frequent vehicle speed being a vehicle speed that is most frequent, the vehicle group including a plurality of vehicles traveling in a group, the vehicle group traveling at one of the most frequent vehicle speed and a speed close to the most frequent vehicle speed;

generating, by the driving assistance device, the searched vehicle group and distance information on a distance between the vehicle group and an information-receiving vehicle that has sent the most frequent vehicle speed;

sending, by the driving assistance device, the generated distance information to the user terminal device corresponding to the information-receiving vehicle; and assisting, by the driving assistance device, the vehicle in merging into one of the searched vehicle groups.

6. A non-transitory recording medium storing a program, wherein the program causes a driving assistance device to execute a vehicle group search step, a distance information generation step, a distance information sending step, and a merging assistance step, the driving assistance device being configured to be communicably connected to a vehicle and to a user terminal device associated with a user who uses the vehicle and to acquire information on a vehicle speed and a position of the vehicle from the vehicle for assisting in driving the vehicle, the vehicle group search step is a step for acquiring a most frequent vehicle speed of the vehicle and for searching for one or more vehicle group, the most frequent vehicle speed being a vehicle speed that is most frequent, the vehicle group including a plurality of vehicles traveling in a group, the vehicle group traveling at one of the most frequent vehicle speed and a speed close to the most frequent vehicle speed, the distance information generation step is a step for generating the vehicle group searched for by the vehicle group search step and distance information on a distance between the vehicle group and an information-receiving vehicle that has sent the most frequent vehicle speed, the distance information sending step is a step for sending the distance information generated by the distance information generation step to the user terminal device corresponding to the information-receiving vehicle, and the merging assistance step is a step for assisting the vehicle in merging into one of the vehicle groups searched for by the vehicle group search step.

* * * * *